United States Patent [19]

Calton et al.

[11] Patent Number: 5,551,245
[45] Date of Patent: Sep. 3, 1996

[54] HYBRID AIR-CONDITIONING SYSTEM AND METHOD OF OPERATING THE SAME

[75] Inventors: Dean S. Calton, Lavernia, Tex.; James A. Coellner, Philadelphia; Paul R. Heimann, Wyncote, both of Pa.; Douglas C. Scott, LaVerne, Calif.

[73] Assignee: Engelhard/ICC, Philadelphia, Pa.

[21] Appl. No.: 409,296

[22] Filed: Mar. 23, 1995

Related U.S. Application Data

[63] Continuation-in-part of Ser. No. 378,154, Jan. 25, 1995.

[51] Int. Cl.[6] ............................. F25D 17/06; F28D 3/00
[52] U.S. Cl. ................................. 62/90; 62/94; 62/271
[58] Field of Search .......................... 62/94, 271, 238.3, 62/510, 90

[56] References Cited

U.S. PATENT DOCUMENTS

| | | | |
|---|---|---|---|
| 2,499,901 | 3/1950 | Brown, Jr. | 257/239 |
| 2,926,502 | 3/1960 | Munters et al. | 62/94 |
| 3,598,179 | 8/1971 | Giauque | 165/111 |
| 3,835,920 | 9/1974 | Mondt | 165/81 |
| 3,871,852 | 3/1975 | Pei | 65/4 |
| 4,002,198 | 1/1977 | Wagner et al. | 165/61 |
| 4,093,435 | 6/1978 | Marron et al. | 55/269 |
| 4,134,743 | 1/1979 | Macriss et al. | 55/34 |
| 4,228,847 | 10/1980 | Lindahl | 165/10 |
| 4,236,577 | 12/1980 | Neudeck | 165/175 |
| 4,255,171 | 3/1981 | Dravnieks | 55/269 |
| 4,535,838 | 8/1985 | Gray et al. | 165/134 R |
| 4,594,860 | 6/1986 | Coellner et al. | 62/271 |
| 4,905,479 | 3/1990 | Wilkinson | 62/271 |
| 5,137,080 | 8/1992 | Haasch et al. | 165/78 |
| 5,148,374 | 9/1992 | Coellner | 364/505 |
| 5,170,633 | 12/1992 | Kaplan | 62/94 |
| 5,176,005 | 1/1993 | Kaplan | 62/94 |
| 5,265,673 | 11/1993 | Hucsko | 165/176 |
| 5,318,109 | 6/1994 | Yamada et al. | 165/135 |
| 5,325,676 | 7/1994 | Meckler | 62/371 X |
| 5,353,606 | 10/1994 | Yoho et al. | 62/371 |

OTHER PUBLICATIONS

Kays, W. M., et al., "Heat Transfer and Flow–Friction Design Data", *Compact Heat Exchangers*, 3d Ed., Chapter 10, pp. 186–188, 279.

*Primary Examiner*—William E. Wayner
*Attorney, Agent, or Firm*—Panitch Schwarze Jacobs & Nadel, P.C.

[57] ABSTRACT

A hybrid air-conditioning system for controlling the condition of air in a building-enclosed space includes a first fan for passing process air from an ambient space through a first pre-cool evaporator coil, through a first zone of a rotatable moisture transfer wheel and then through a first zone of a rotatable heat exchange wheel to an enclosed and conditioned space. A second fan passes regenerative air from the enclosed and conditioned space through a second zone of the heat exchange wheel, through a first condenser coil, through a second zone of the moisture transfer wheel and then to the ambient space. The system further includes first and second compressors. The first compressor is in fluid communication with the first pre-cool evaporator coil and with the first condenser coil. The second compressor has a suction side in fluid communication with a second pre-cool evaporator coil and with a second condenser coil. The second condenser coil has first and second coil sections, with the first coil section of the second condenser coil positioned between the first condenser coil and the second zone of the moisture transfer wheel and the second coil section of the second condenser coil positioned between the second zone of the moisture transfer wheel and the ambient space.

8 Claims, 5 Drawing Sheets

HYBRID AIR-CONDITIONING SYSTEM AND METHOD OF OPERATING THE SAME

This application is a continuation-in-part of U.S. application No. 08/378,154, filed on Jan. 25, 1995.

FIELD OF THE INVENTION

The present invention relates to a hybrid air-conditioning system and, more particularly, to an air-conditioning system which utilizes the combination of an electric heat pump and regenerative type periodic flow device for conditioning air within an enclosed space wherein the air within the enclosed space is exhausted from the enclosed space at a relatively high rate.

BACKGROUND OF THE INVENTION

Regenerative type periodic flow devices are conventionally employed for the transfer of heat or of other constituents from one fluid stream to another, and thereby from one area or zone in space to another. Typically, a sorptive mass is used to collect heat or a particular mass component from one fluid stream which flows over or through the sorptive mass. The flowing fluid is rendered either cooler (in the case of heat sorption) or less concentrated (in the case of, for instance, adsorption of particular gases). The sorptive mass is then taken "off-stream" and regenerated by exposure to a second fluid stream which is capable of accepting the heat or material desorbed with favorable energetics.

In many instances, the sorptive material is contained within a vessel or distributed within a bed structure. It is desirable that such material be provided with maximum surface area, and that the fluid flow through the sorptive material matrix in a smooth (non-turbulent) and regular state. Once the sorptive material has been saturated (i.e., has reached its maximum designed capacity for sorption), the vessel or bed is then removed from the fluid flow path and exposed to a second fluid flow to regenerate the sorptive capacity of the material by, for instance, cooling the sorptive material or desorbing material taken up during "on-stream" operation. After such regeneration, the sorptive material is once more placed back "on-stream" and the operation continues.

From such single cycle systems evolved multiple vessel systems which permitted semi-continuous (or semi-batch) operation by synchronously alternating two or more sorptive vessels between on-stream and off-stream operation. The choice of numbers of vessels and cycle structures depends on many factors, but most importantly the ratio between consumption rate of the sorptive capacity of the vessel, and regeneration rates for that same vessel.

In some applications, semi-continuous systems have evolved into continuous flow systems where the sorptive media itself is moved between two or more flowing fluid streams. The most common construction employed for such systems is a porous disk, often referred to as a wheel or rotor. In its simplest form, such a wheel is divided into two flow zones, and fluid is passed over the sorptive surface of the wheel (typically flowing through the thickness of the disc parallel to the rotational axis of the cylinder) as the wheel is rotated to carry the sorptive material from one zone, into the other, and back again to complete a revolution. In a heat exchanger wheel, for instance, one zone of warm fluid and one zone of cooler fluid are present. Heat is adsorbed by the material of the wheel in the warm flow zone, and is carried away from the wheel as the sorptive material passes through the cool flow zone. U.S. Pat. No. 4,594,860 discloses such a continuous flow system and is hereby incorporated by reference.

FIG. 1 illustrates a schematic of a conventional open-cycle air-conditioning system, generally designated 9. A moisture transfer wheel assembly 11 constitutes the exterior or outside element of the system 9. As discussed hereinafter, the moisture transfer wheel 11 is separated into two sections to provide an intake path and an exhaust path through the moisture transfer wheel 11, as indicated by the arrows. A heat exchanger wheel assembly 13, also partitioned to provide intake and exhaust paths, is located substantially adjacent to the moisture transfer wheel 11, separated only by a heat regeneration coil 19. An auxiliary heating coil 21 may be placed in the system 9 for use in cold months when it is desirable to heat the interior of the area to be conditioned, rather than to cool it. The heat regeneration coil 19 and heating coil 21 include fluid pipes (not shown) which are interconnected with standard heating units (not shown), such as a solar heating unit. The system 9 terminates in a pair of evaporator elements 15 and 17 separated by a partition 6 with the arrows indicating the intake air into the building and the air exhausting therefrom. A supply blower 23 and an exhaust blower 25 are provided to implement the necessary air movement within the system.

As is well known, the system 9 provides removal of the moisture from the intake air by the moisture transfer wheel 11. When moisture is removed from the air, the temperature of the air increases. The air is subsequently cooled upon passing through heat exchanger wheel 13, which lowers the temperature of the warm, dry air. Evaporator element 15 adds moisture to the air, thus reducing the temperature further and supplying cool air to the conditioned area. The exhaust air passes through evaporator element 17 and through heat exchanger wheel 13 to remove heat from the heat exchanger and raise the temperature of the exhaust air. The temperature of the exhaust air is further raised by means of the heat regeneration coil 19 to provide high temperature air in the exhaust path, resulting in regeneration of the moisture transfer wheel 11. The air from the moisture transfer wheel 11 is exhausted into the atmosphere. The system 9 is disclosed in U.S. Pat. No. 4,594,860, accordingly, further description of the structure of the system 9 is omitted for purposes of brevity only, and is not limiting.

There is a temperature relationship between the process or intake air leaving the moisture transfer wheel 11 and the required regeneration temperature of the regeneration or exhaust air entering the moisture transfer wheel 11. The temperature of the regeneration air entering the moisture transfer wheel 11 needs to be high enough to create a vapor pressure which is lower than the vapor pressure of the process air leaving the moisture transfer wheel 11, which is then moved to the heat transfer wheel 13. The regeneration air entering the moisture transfer wheel 11 also needs to have enough sensible energy for the condensed water trapped in the moisture transfer wheel 11 to vaporize and free itself from the moisture transfer wheel 11. In the past, the temperature of the regeneration air entering the moisture transfer wheel 11 was required to be a minimum of forty degrees Fahrenheit higher, and as much as one-hundred-and-fifty degrees Fahrenheit higher than the temperature of the process air leaving the moisture transfer wheel 11 toward the heat transfer wheel 13.

Where the moisture transfer wheel 11 can regenerate at a relatively low temperature, for instance, one-hundred-and-forty degrees Fahrenheit, the moisture transfer wheel 11 has the advantage of using waste heat from conventional air-conditioning and refrigeration condensers, among other sources. However, where the moisture transfer wheel 11 can regenerate at relatively low temperatures, there is a problem with treating process air which is drawn from ambient conditions which has the potential of being both high in temperature and humidity. Hot ambient temperatures limit the amount of moisture that can be removed from the incoming process air because the process air leaving the moisture transfer wheel 11 has to have a lower temperature than the regeneration temperature. As the process air passes through the moisture transfer wheel 11, the latent heat of vaporization is released by the water vapor being withdrawn from the air and, as a result, the air picks up the latent heat. The released latent heat increases the air temperature at a relationship of about 0.62 degrees-per-grain of moisture removed. When treating ambient air which is both high in temperature and humidity, less moisture can be absorbed by the moisture transfer wheel 11 and converted to sensible temperature before the process air begins to approach the regeneration temperature limit. Thus, the system will reach some equilibrium at a much-reduced latent capacity. Thus, a need has arisen for a regenerative-type air-conditioning system which can process ambient air which is both high in temperature and moisture without reducing the latent capacity of the system.

While the foregoing problem of not being able to treat process air which is derived from one-hundred-percent ambient air has been solved in the past by taking the process air from within the space to be conditioned (i.e., a recirculation unit), the use of a recirculation unit cannot meet the demands of all air-conditioning applications. For instance, where the space to be conditioned includes a supplemental relatively high volume exhaust system, such as in a commercial kitchen having large exhaust fans for removing air and smoke from the cooking area. In such an application, a recirculation unit would not meet the demand for replacing air within the enclosed space. As a result, a negative pressure would be created within the space to be conditioned thereby causing ambient air to enter the space to be conditioned whenever a door or window is opened.

The heat regeneration coil 19 and heating coil 21 of the system 9 are of conventional structure. That is, in conventional coil arrangements, the tubing is mechanically connected to fin sheets. The fin sheets are used to extend the surface area of the tubes to increase the coil's heat-transfer effectiveness. That is, a typical condenser or cooling coil is made up of finned tube sheets with good transfer conduction material, typically aluminum or copper, with holes punched in a pattern array through which the tubes are inserted. Through various means, the tubes are expanded to make good contact with the finned tube sheets. In a typical application, air passes over the tubes and fins and is either cooled or heated by the fluid flowing inside the tubes.

Since heat is conducted not only to the area that passes over the fin sheets, but from the warmest area on the finned surface to the coolest area on the finned surface, because of the high conduction of fin sheets, the fin sheets tend to average out the temperature across the coil, even though the fluid in the tube is at different temperatures between front and back. Thus, the upper and lower temperature limits to which the air can be heated or cooled is therefore limited, which directly affects the total heat transferred by the coil and the energy efficiency of the system 9. Thus, a need has arisen for a condensing or cooling coil which can minimize the effect of averaging out the temperature across the coil without losing the benefit of the use of fin sheets.

The present invention solves the foregoing problems by pre-cooling the process air entering the moisture transfer wheel and separating the coils into two sections. By knowing the performance of the moisture transfer wheel at various dew points, the process air entering the moisture transfer wheel could be cooled to a specific dew point depending on the desired leaving-air humidity. Pre-cooling the process air entering the moisture transfer wheel increases the total moisture removed by the moisture transfer wheel 11 because the process air entering the moisture transfer wheel 11 could handle a greater increase in temperature (due to the latent heat of vaporization) before approaching the regeneration temperature limit. Separating the condensing coils into two sections spaced by an air gap minimizes the averaging effect by preventing heat transfer across the fin sheets between the two sections. Use of the present invention results in a hybrid air-conditioning system which can process one-hundred-percent ambient air, regardless of its temperature, in an energy-efficient manner.

In order to increase efficiency at higher incoming regenerative air temperatures, it has also been found to be more efficient to operate two independent, closed systems with a refrigerant fluid with independent compressors. Optimal placement of the separated condensing coils from each system and the relative positioning of the pre-cool evaporators results in increased system efficiency and performance.

SUMMARY OF THE INVENTION

Briefly stated, the present invention comprises a hybrid air-conditioning system for controlling the condition of air in a building enclosed space. The system includes a first fan for passing process air from an ambient space through a first pre-cool evaporator coil, through a first zone of a rotatable moisture transfer wheel and then through a first zone of a rotatable heat exchange wheel to an enclosed and conditioned space and a second fan for passing regenerative air from the enclosed and conditioned space through a second zone of the heat exchange wheel, through a first condenser coil, through a second zone of the moisture transfer wheel and then to the ambient space. The system further includes first and second compressors. The first compressor has a suction side in fluid communication with a first side of the first pre-cool evaporator coil and a discharge side in fluid communication with a first side of the first condenser coil. A second side of the first pre-cool evaporator coil is in fluid communication with a second side of the first condenser coil. The second compressor has a suction side in fluid communication with a first side of a second pre-cool evaporator coil and a discharge side in fluid communication with a first side of the second condenser coil. The second condenser coil has a second side in fluid communication with a second side of the second pre-cool evaporator coil. The second condenser coil has first and second coil sections, with the first coil section of the second condenser coil being positioned between the first condenser coil and the second zone of the moisture transfer wheel and the second coil section of the second condenser coil being positioned between the second zone of the moisture transfer wheel and the ambient space such that the regenerative air passes through the first and second sections of the second condenser coil.

BRIEF DESCRIPTION OF THE DRAWINGS

The foregoing Summary, as well as the following Detailed Description of Preferred Embodiments, will be better understood when read in conjunction with the appended drawings.

For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
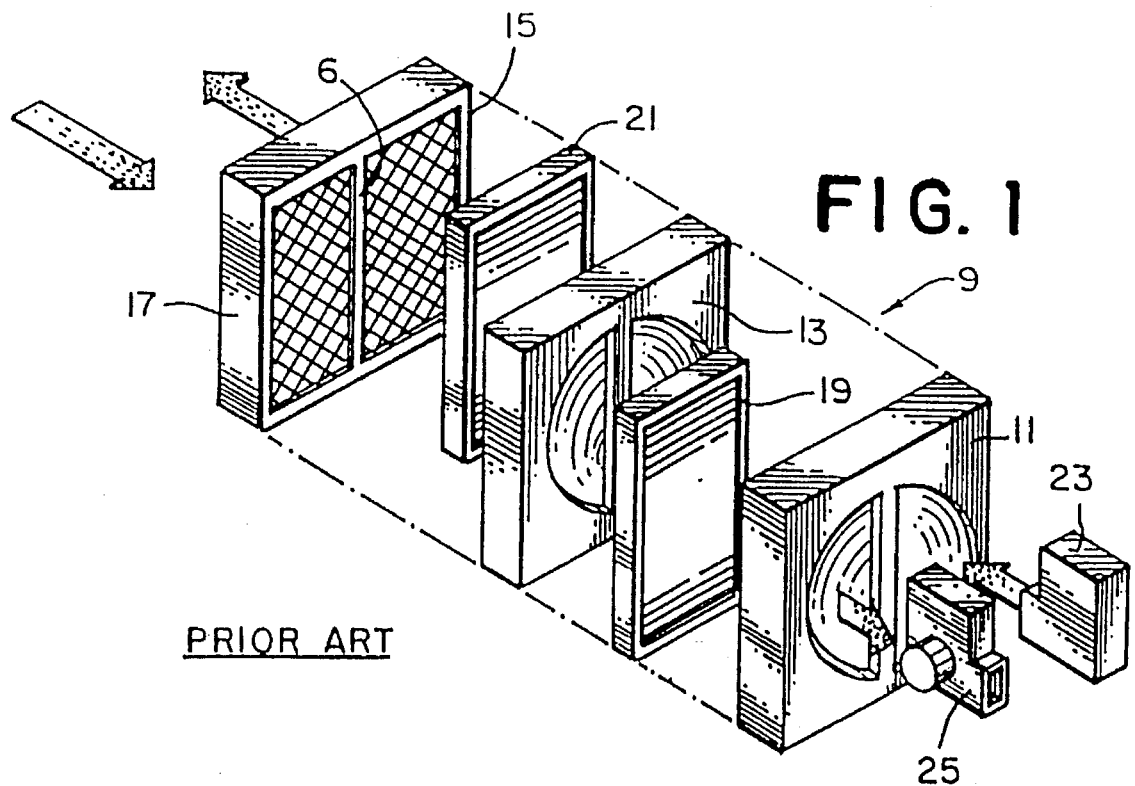
FIG. 1 is a diagrammatic perspective view of a conventional hybrid air-conditioning system.

Certain terminology is used in the following description for convenience only, and is not limiting. The words "right," "left," "lower" and "upper" designate directions in the drawings to which reference is made. The words "inwardly" and "outwardly" refer to directions toward and away from, respectively, the geometric center of the hybrid air-conditioning system and designated parts thereof. The terminology includes the words above-specifically mentioned, derivatives thereof and words of similar import.

Figure 2:
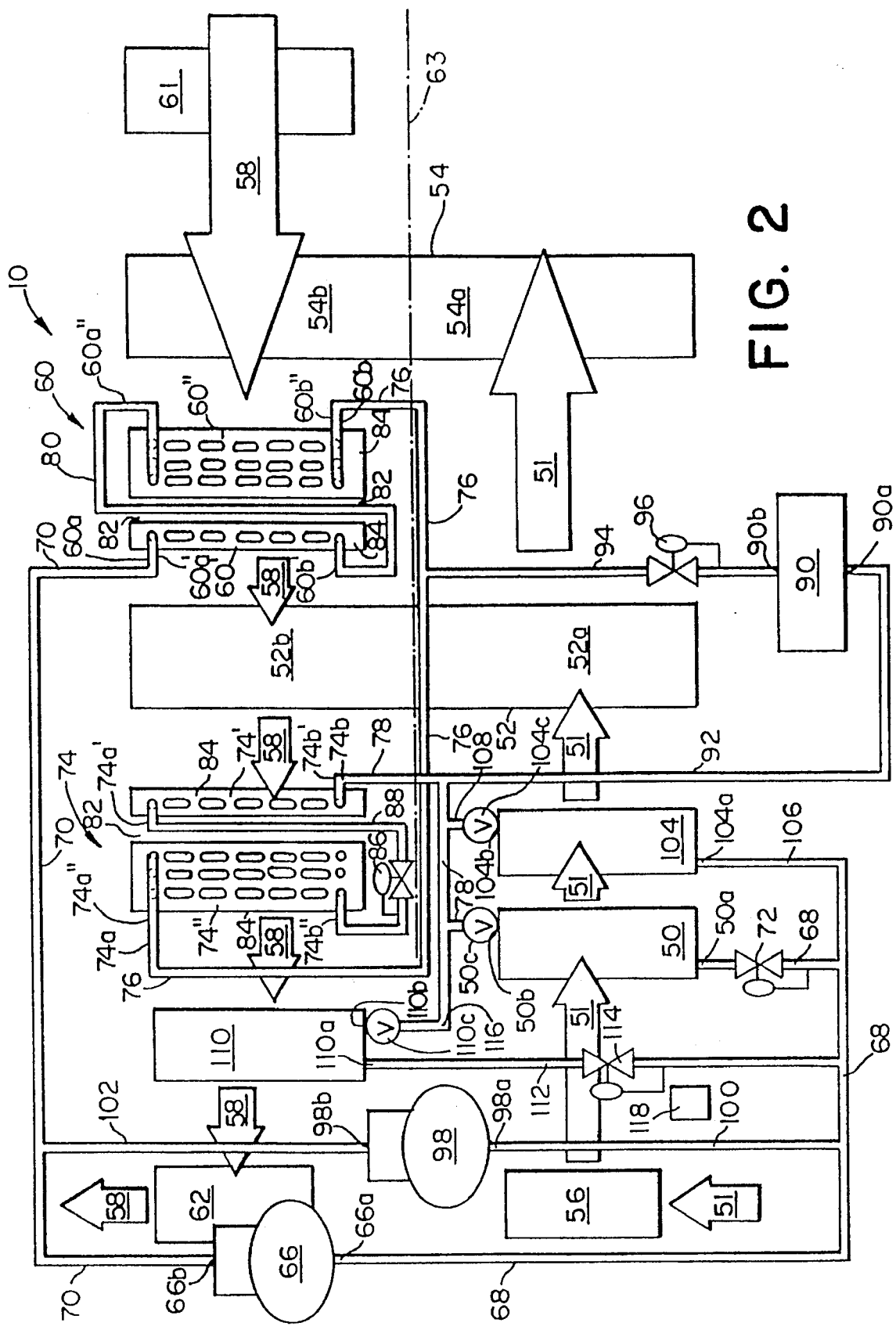
FIG. 2 is a schematic view of a hybrid air-conditioning system in accordance with a first preferred embodiment of the invention.

Referring now to the drawings in detail, wherein like numerals are used to indicate like elements throughout, there is shown in FIGS. 2 through 6 a first preferred embodiment of a hybrid air-conditioning system, generally designated 10, for controlling the condition of air in a building-enclosed space (not shown). Referring now to FIG. 2, the system 10 includes first means for passing process air, represented by the arrow 51, from an ambient space (not shown) through a first pre-cool evaporator coil 50, through a first zone 52a of a rotatable moisture transfer wheel 52 and then through a first zone 54a of a rotatable heat-exchange wheel 54 to an enclosed and conditioned space (not shown). In the first preferred embodiment, the first means for passing process air from the ambient space through the system 10 is a fan or blower 56. The fan 56 draws one-hundred-percent air from ambient conditions and passes it through the system 10, as described hereinafter. Thus, in the first preferred embodiment, the system 10 of the present invention does not recirculate any of the air from within the enclosed and conditioned space. However, it is understood by those of ordinary skill in the art from this disclosure, that the system 10 could be used as a recirculation unit or as unit which processes both recirculated and ambient air.

In the first preferred embodiment, the fan 56 is preferably positioned upstream from the first pre-cool evaporator coil 50 directly adjacent thereto. However, it is understood by those skilled in the art from this disclosure that the fan 56 could be positioned upstream from the first pre-cool evaporator coil 50 at a significant distance therefrom, using conventional ducts (not shown). While it is preferred that the first means for passing process air from the ambient space through the system 10 be comprised of a fan 56, it is understood by those of ordinary skill in the art from this disclosure that other devices could be used to pass air through the system 10, such as through the use of negative or positive pressure zones.

The system 10 further includes second means for passing regenerative air, generally designated by the arrow 58, from the enclosed and conditioned space through a second zone 54b of the heat-exchange wheel 54, through a first condenser coil 60, through a second zone 52b of the moisture transfer wheel 52 and then to the ambient space. The second means for passing the regenerative air 58 from the enclosed and conditioned space through the system 10 to the ambient space preferably is comprised of a fan or blower 62, generally identical to the fan 56 described above. The fan 62 for moving regenerative air 58 through the system 10 is located downstream from the second zone 52b of the moisture transfer wheel 52 either adjacent thereto or a distance therefrom, but in fluid communication therewith, using ducts (not shown).

The rotatable moisture transfer wheel 52 constitutes the exterior or outside element of the system 10. As discussed in more detail hereinafter, the moisture transfer wheel 52 is separated into two sections to provide an intake path (i.e., for the process air 51) and an exhaust path (i.e., for the regenerative air 58) through the moisture transfer wheel 52. The heat exchange wheel 54 is also partitioned to provide intake and exhaust paths, and is located substantially adjacent to the moisture transfer wheel 52, separated only by the first condenser coil 60. The moisture transfer wheel 52 and heat exchange wheel 54 are rotatably supported within a housing (not shown), described in more detail hereinafter, which includes a partition, represented by the line 63, which coincides with the partitioning of the moisture transfer and heat exchange wheels 52, 54 to thereby divide the system 10 into an intake path (hereinafter referred to as the "process side") having the first zones 52a, 54a of the moisture and heat exchange wheels 52, 54 and first pre-cool evaporator 50 therein and an exhaust path (hereinafter referred to as the "regenerative side") having the second zones 52b, 54b of the moisture transfer and heat exchange wheels 52, 54 and first condenser coil 60 therein.

Generally, the operation of the moisture transfer and heat exchange wheels 52, 54 is well known. That is, the system 10 provides removal of the moisture from the process air 51 by the moisture transfer wheel 52. When moisture is removed from the process air 51, the temperature of the process air 51 increases. The process air 51 is subsequently cooled upon passing through the heat exchange wheel 54, which lowers the temperature of the warm, dry air. An evaporator element (not shown) may be positioned on the process side downstream of the first zone 54a of the heat exchange wheel 54 to reduce the temperature further and supply even cooler air to the enclosed and conditioned space. The regenerative air 58 flows over an evaporator pad 61 and then through the second zone 54b of the heat exchange wheel 54 to remove heat from the heat exchange wheel 54 and raise the temperature of the regenerative air 58. The evaporator pad 61 lowers the dry bulb temperature of the regenerative air 58 to the regenerative air's 58 wet bulb temperature in the range of about 65 to 80 degrees F., depending upon whether the regenerative air 58 is drawn from the building enclosed space or from atmosphere. Lowering the wet bulb temperature of the regenerative air entering the heat exchange wheel 54 assists in removing heat from the heat exchange wheel 54. The temperature of the regenerative air 58 exiting the heat exchange wheel 54 is further raised by the first condensing coil 60, as described in more detail hereinafter, to provide high temperature regenerative air 58 on the regenerative side of the system 10 just upstream from the second zone 52b of the moisture transfer wheel 52, resulting in regeneration of the moisture transfer wheel 52 as the regenerative air 58 passes therethrough. The regenerative air 58 then passes from the moisture transfer wheel 52 into the atmosphere.

Two elements of the system 10 which contribute to the coefficient performance (COP) of the system 10 are the moisture transfer wheel 52 and the heat exchange wheel 54. With the exception of the specific material used in these wheels, they may be constructed in substantially the same manner.

Figure 3:
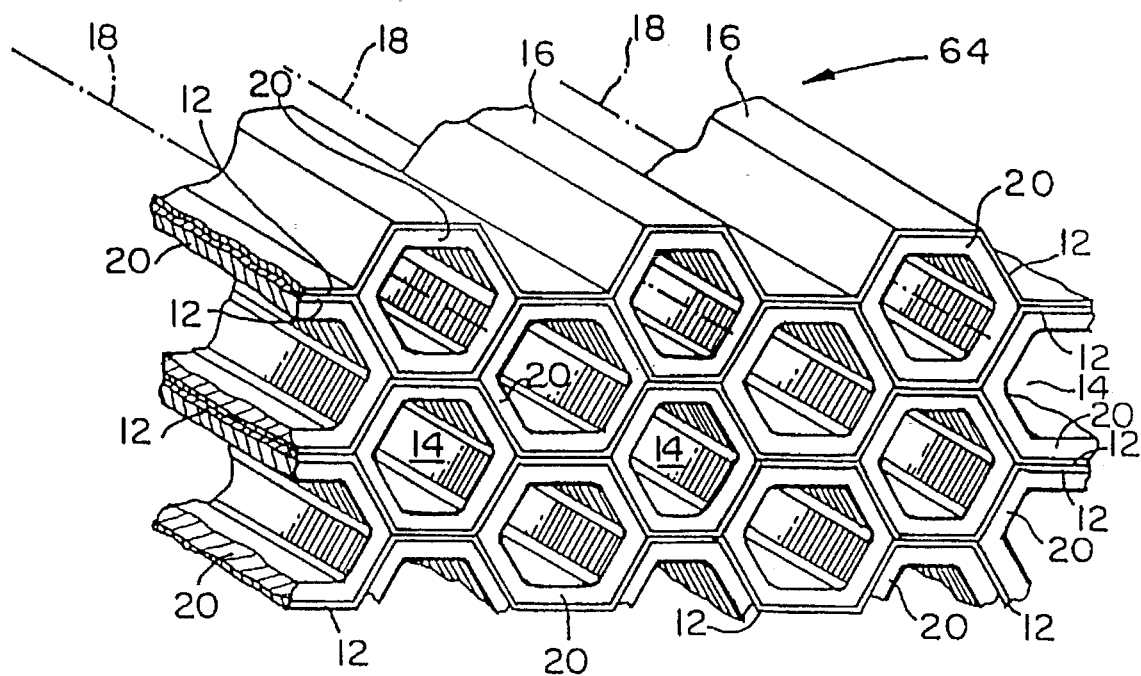
FIG. 3 is a greatly enlarged cross-sectional view of a core of a moisture transfer wheel used in the air-conditioning system shown in FIG. 2.
Figure 4:
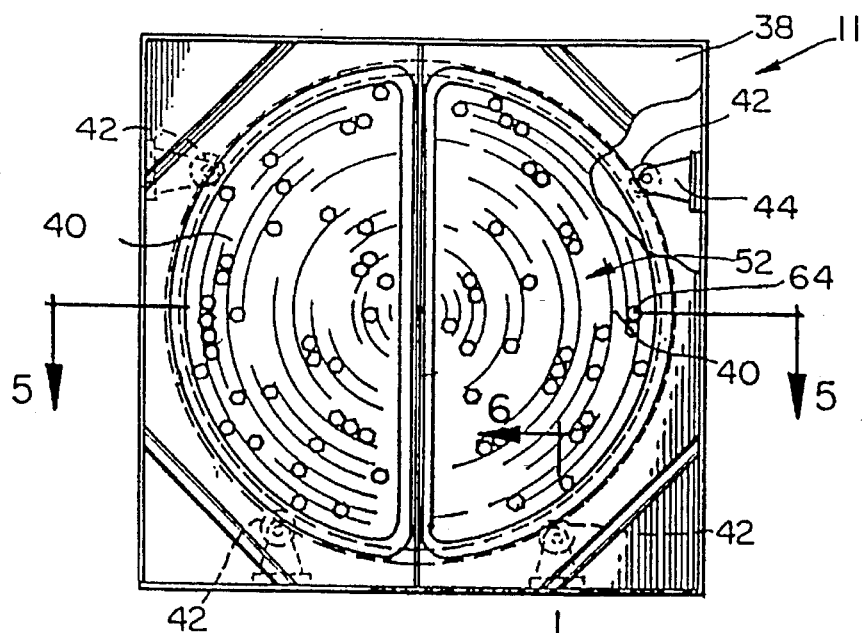
FIG. 4 is an enlarged front-elevational view of the moisture transfer wheel rotatably supported within a housing.

Referring now to FIGS. 3–6 and turning now to the construction of the moisture transfer wheel 52, the moisture transfer wheel 52 is rotatably mounted within a housing 38, as illustrated in FIG. 4. The moisture transfer wheel 52 comprises a core 64 and a rim 34. The core 64 is comprised of a plurality of adjoining parallel channels 14, as illustrated in FIG. 3. According to a preferred embodiment of the core 64, each of the channels 14 is generally in the form of a hexagon in cross section and includes an internal surface area 16. It is also preferred that the channels 14 be formed from a plurality of stacked layers of material 12. The layers of material 12 of the channels 14 have a minimum thickness to inhibit the effect of the wall thickness increasing the pressure drop through the core 64 and yet provide the core 64 with sufficient structural integrity to be self supporting. In the first preferred embodiment, it is preferred that the layers of material have a thickness of about 0.0015 inches. It is understood by those skilled in the art from this disclosure that the exact thickness of the walls formed by the layers of material 12 could vary, depending upon the particular application of the core 64 and existing manufacturing techniques, without departing from the spirit and scope of the invention. For instance, the thickness of the walls formed by the layers of material 12 could be in the range of about 0.001 to 0.006 inches.

Each of the channels 14 includes a centrally disposed longitudinal axis 18. The channels 14 are preferably sized such that a distance between and along longitudinal axes of adjacent channels is generally uniform (i.e., the adjacent channels 14 are equidistantly spaced from each other and extend generally parallel with respect to each other). In the first preferred embodiment, it is preferred that the distance between the longitudinal axes 18 be in the range of about 0.050 to 0.125 inches. Thus, the channels 14 of the present invention, due to their hexagonal cross-sectional configuration, are closely adjoined to increase the available transfer surface per unit of volume.

In the present embodiment, it is preferred that the layers of material 12 be comprised of a non-metallic, high-strength, temperature-resistant, low thermal conductivity material, such as Nomex<< aramid in paper form. The process of assembling the layers of material 12 in the form of the channels 14 is well understood by those skilled in the art. An example of a commercially available product which meets the criteria of the present invention is Aeroweb<< HMX-20 without the resilient resin coating, manufactured by Ciba Composites of Anaheim, Calif., a division of Ciba Geigy Corporation of Ardsley, N.Y. However, it is understood by those skilled in the art from this disclosure that the layers of material 12 and the manner in which they are formed are not pertinent to the present invention, and that other materials, such as kraft paper, nylon fiber paper, mineral fiber paper and the like could be used to construct the layers of material 12 and that other methods could be used to form the hexagonal channels 14, such as extrusion, machining or molding, without departing from the spirit and scope of the invention.

In the first preferred embodiment, the internal surface area 16 is coated with a desiccant material 20 which interacts with the fluid media flowing through the channels 14 to achieve water absorption from the air. In the first preferred embodiment, it is preferred that the core 64 be used in connection with both the moisture transfer wheel 52 and the heat exchange wheel 54 and that the desiccant 20 be an exchange or sorbent material which exchanges or sorbs one of heat and mass with the fluid media flowing through the channels 14. That is, it is preferred that the exchange or sorbent material be capable of removing mass or transferring heat from the fluid media flowing through the channels 14 and be capable of transferring mass or heat to the fluid media flowing through the channels 14. As used herein, the terms sorb and sorptive mean adsorption and/or absorption.

In the first preferred embodiment, it is preferred that the exchange or sorbent material be a desiccant material, such as a crystalline titanium silicate molecular sieve zeolite compound manufactured by Engelhard Corporation of Edison, N.J. under the trade name ETS and disclosed in U.S. Pat. No. 4,853,202, which is hereby incorporated by reference.

The use of channels having a cross section which is generally in the form of a hexagon is advantageous over other geometries, such as sinusoidal, square, and triangular. The following is a brief explanation of why a hexagon is better than other geometries. For a more detailed explanation, see U.S. patent application Ser. No. 08/246,548, filed May 20, 1994, which is hereby incorporated by reference in its entirety. First, the theoretical available transfer surface area (i.e., based upon standard measurements and calculations of the geometries prior to coating the interactive material) of a hexagon is greater than the transfer surface area of a sinusoidal, triangle or square for a given volume.

Second, the practical available transfer surface area (i.e., based upon standard measurements and calculations of the geometries after coating of the interactive material) of a hexagon is relatively greater, as compared to theoretical calculations, than the transfer surface area of a sinusoidal, triangle or square for a given volume because there are less surface area losses due to corner buildup. It is generally known that sorbent mass transfer is analogous to heat transfer. This relationship is defined in U.S. Pat. No. 5,148,374, which is hereby incorporated by reference, as the number of transfer units which corresponds to the effectiveness of the heat transfer. The greater the number of transfer units, the more effective the heat transfer. The number of transfer units is dependent on, among other things, the available transfer surface area. By minimizing corner build up, the core 64 of the present invention achieves a number of transfer units which is equal to or greater than the number of transfer units the prior art cores achieve.

Third, the pressure drop through the core 64 of the present invention is significantly less than the core constructed of the geometries mentioned above because there is virtually no buildup in the corners of the generally hexagon shaped channels 14. Hence, the power necessary to force the fluid media through the core 64 is significantly less than that needed to force the fluid media through the prior art cores. For instance, in the case of gas heated hybrid desiccant air-conditioning systems, the reduction in power requirements allows the desiccant systems to operate at the same cost as conventional CFC air-conditioning systems for the same output of BTU's, without the inherent risk to the environment presented by CFC air-conditioning systems.

Fourth, the hexagonal core 64 provides much better bonding between channels or cells compared to the wound corrugated process described in the aforementioned patent application. Thus, the possibility for leakage of either fluid from one stream to the other at the sealing points is greatly reduced.

While in the present invention it is preferred that the channels 14 be configured to be generally in the form of a hexagon in cross section, it is understood by those skilled in the art form this disclosure that the cross section of the channels could be other straight-sided shapes with equal angles and equal side lengths, such that the cross section approaches a circle, and which permit the channels to be closely adjoined to maximize the greatest transfer surface area per unit volume without departing from the spirit and scope of the invention. Although it is also understood by those skilled in the art from this disclosure that other geometries could be used, such as, triangle, square, sinusoidal, so long as the operating parameters described below are attained, without departing from the scope and spirit of the invention.

The preferred method of making the core 64 comprises forming the plurality of adjoining channels 14 such that the channels 14 are generally in the form of a hexagon in cross section. As is described above, each of the channels 14 has a centrally disposed longitudinal axis 18. The internal surface area 16 of the channels 14 is then coated with a suspension of the zeolite in water. After coating, the substrate/coating is dried to remove the water and provide zeolite adhered to the substrate. The coating of the internal surface area 16 of the channels 14 with the zeolite 20 is accomplished by forced flow passing of the zeolite 20, as suspended in water with silicate, through the channels 14 at a laminar flow rate. The coating of surfaces using forced-flow passing is well understood by those of ordinary skill in the art and, therefore, further description thereof is omitted for purposes of convenience only. However, it is also understood by those skilled in the art from this disclosure that the suspension of zeolite 20 could be applied to the internal surface area 16 of the channels 14 in other manners. For instance, the zeolite 20 could be applied, in a suspension form, to the internal surface area 16 by deposition, wherein the suspension is passed through the core 64 using a non-flooding technique. Alternatively, the zeolite 20 could be applied to the layers of material 12 prior to assembling the layers of material 12 into the generally hexagonal channels 14 or the zeolite 20 could be incorporated in the material which makes up the layers of material 12. Although it is preferred for reasons of safety and economy to use water as the suspension medium, organic solvents or mixtures of organic solvent(s) with water may also be employed.

Figure 5:
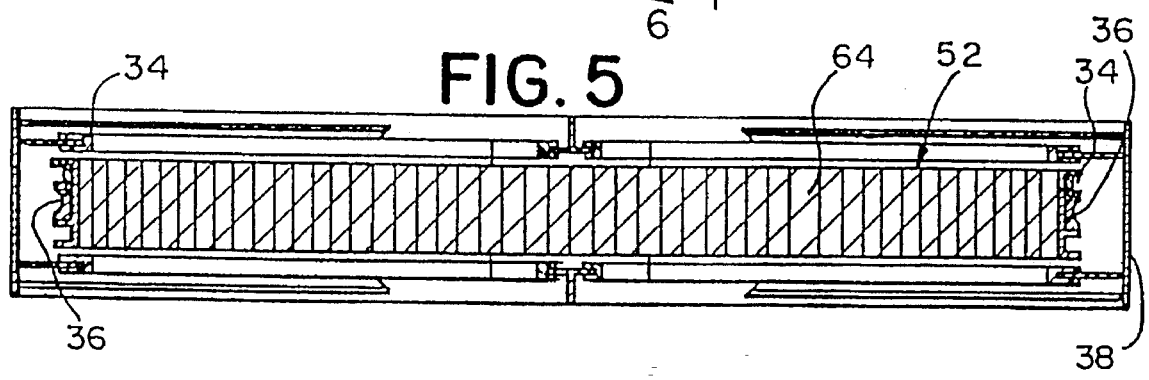
FIG. 5 is an enlarged cross-sectional view of the moisture transfer wheel shown in FIG. 4 taken along lines 5—5 of FIG. 4.
Figure 6:
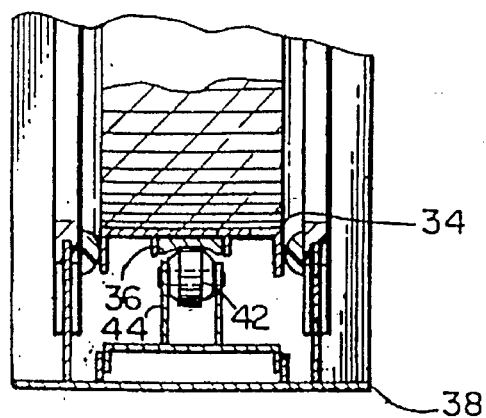
FIG. 6 is a greatly enlarged cross-sectional view of the moisture transfer wheel and housing shown in FIG. 4 taken along lines 6—6 of FIG. 4.

Referring now to FIGS. 4 through 6, there is shown the moisture transfer wheel 52 having the core 64 disposed therein. The layers of material 12 which form the channels 14 of the core 64 provide the core 64 with sufficient structural integrity for most size wheels to avoid the requirement of a hub assembly and spokes, and thus in a preferred embodiment, as shown in FIG. 4, there is no hub assembly or spokes.

The rim 34 has a radially outwardly extending track 36 on its external surface. The track 36 allows the moisture transfer wheel 52 to be supported at its periphery, and then rotatably mounted within the housing 38, as shown in FIG. 4. The housing 38 is generally in the form of a parallelepiped and includes a pair of semi-circular openings 40 on each side to allow the moisture transfer wheel 52 to be placed in the system 10 in alignment with the process and regenerative sides. A plurality of support wheels 42 are disposed within the housing 38 and are in rolling engagement with the track 36. The support wheels 42 are positioned to rotatably support the moisture transfer wheel 52 in the housing 38 such that the core 64 of the moisture transfer wheel 52 is in alignment or registry with the semicircular openings 40. As shown in FIG. 6, the support wheels 42 are supported within the housing 38 by a generally T-shaped support member 44 which permits the support wheel 42 to rotate with respect to the support member 44 in a manner well understood by those of ordinary skill in the art. The particular manner in which the support wheels 42 are supported within the housing 38 is not pertinent to the present invention. A drive mechanism (not shown) is disposed within the housing 38 and drivingly engages the exterior of the rim 34 to rotate the moisture transfer wheel 52 with respect to the housing 38.

The components of the housing 38 are preferably constructed of a high-strength, lightweight material, such as aluminum. However, it is understood by those skilled in the art from this disclosure that the housing 38 could be constructed of other materials, such as a polymeric material or stainless steel, without departing from the spirit and scope of the invention.

The details of the mounting and driving of the moisture transfer wheel 52 within the housing 38 are not pertinent to the present invention. It is recognized by those of ordinary skill in the art from this disclosure that the moisture transfer wheel 52 can be mounted in any manner without departing from the spirit and scope of the invention. Accordingly, further description thereof is omitted for purposes of convenience only, and is not limiting.

Referring now to FIG. 2, the system 10 includes a first compressor 66 having a suction side 66a in fluid communication with a first side 50a of the first pre-cool evaporator coil 50 and a discharge side 66b in fluid communication with a first side 60a of the first condenser coil 60. More particularly, the suction side 66a of the first compressor 66 is in fluid communication with the first side 50a of the first pre-cool evaporator 50 via a first conduit 68 and the discharge side 66b of the first compressor 66 is in fluid communication with the first side 60a of the first condenser coil 60 via a second conduit 70. A second side 50b of the first pre-cool evaporator coil 50 is in fluid communication with a second side 60b of the first condenser coil 60, as described in more detail hereinafter.

The first conduit 68 includes a first crank case pressure regulator 72 which senses the pressure on the suction side 66a of the first compressor 66. That is, the position of the first crank case pressure regulator 72 (i.e., open or closed) is responsive to the pressure of the refrigerant fluid within the first conduit 68, for the reasons described hereinafter.

The system 10 further includes a second condenser coil 74 positioned between the second zone 52b of the moisture transfer wheel 52 and the ambient space such that the regenerative air 58 passes through the second condenser coil 74. The second condenser coil 74 includes a first side 74a in fluid communication with the second side 60b of the first condenser coil 60 and a second side 74b in fluid communication with the second side 50*b* of the first pre-cool evaporator 50. The second side 60*b* of the first condenser coil 60 is in fluid communication with the first side 74*a* of the second condenser coil 74 via a third conduit 76 and the second side 74*b* of the second condenser coil 74 is in fluid communication with the second side 50*b* of the first pre-cool evaporator coil 50 via a fourth conduit 78, in a manner well understood by those skilled in the art.

As best shown in FIG. 2, the first condenser coil 60 is divided into first and second coil sections 60' and 60". The first coil section 60' has a first side 60*a'* in fluid communication with the discharge side 66*b* of the first compressor 66 via the second conduit 70. The first coil section 60' of the first condenser coil 60 includes a second side 60*b'* in fluid communication with a first side 60*a"* of the second coil section 60" via a fifth conduit 80. The second coil section 60" has a second side 60*b"* in fluid communication with the second side 50*b* of the first pre-cool evaporator 50 through the third conduit 76, second condenser coil 74 and fourth conduit 78.

In the first preferred embodiment, the first coil section 60' is spaced from the second coil section 60" by an air gap 82 to minimize heat transfer between the first and second coil sections 60', 60". More particularly, the first coil section 60' is comprised of a single row coil wherein the tubes of the coil are thermally connected together by a plurality of thin, thermally conductive fin sheets (only one is shown) 84, in a manner well understood by those skilled in the art. Similarly, the second coil section 60" is comprised of a coil having three rows of tubes thermally connected together by a plurality of thin, thermally conductive fin sheets (only one is shown) 84, also in a manner well understood by those skilled in the art. The air gap 82 exists between the fin sheets of the first and second coil sections 60', 60".

By separating the first condenser coil 60 into the first and second coil sections 60', 60", heat transfer between the first and second coil sections 60', 60" is minimized. That is, the separation of the first and second coil sections 60', 60" eliminates heat transfer from the first coil section 60' to the second coil section 60" through the fin sheets, thereby minimizing the averaging effect described above, and allowing the first coil section 60' to be as hot as possible and the air flowing from the first condensing coil to be as hot as possible.

As can be seen from FIG. 2, since the first coil section 60" only has a single row of tubes and the second coil section 60" has three rows of tubes, the surface transfer area of the first coil section 60' is less than the surface transfer area of the second coil section 60". The first coil section 60' is positioned between the second zone 52*b* of the moisture transfer wheel 52 and the second coil section 60" so that the regenerative air 58 flowing across the first coil section 60' is super heated by the refrigerant fluid flowing directly from the discharge side 66*b* of the first compressor 60 through the second conduit 70. It is preferred that the first coil section 60' be positioned downstream from the second coil section 60" and that the first coil section 60' be in direct fluid communication with the first compressor 66, because it allows the regenerative air 58 flowing across the first condensing coil 60 to see the first coil section 60' last. Since the first coil section 60' is hotter than the second coil section 60" (because the air gap 82 prevents the averaging effect described above), the regenerative air 58 flowing into the moisture transfer wheel 52 can be at higher temperature than with the use of conventional condensing coils, without increasing the temperature of the refrigerant fluid flowing through the coil.

While in the first preferred embodiment, it is preferred that the first coil section 60' and the second coil section 60" be comprised of one and three rows of tubes, respectively, it is understood by those of ordinary skill in the art from this disclosure that the present invention is not limited to any particular number of rows of tubes in either the first or second coil sections 60', 60" and that the first condenser coil 60 can be divided into more than two sections. With respect to the spacing or air gap between the first and second coil sections 60', 60", the spacing is sized to minimize the transfer of heat between the first and second coil sections 60', 60" (i.e., to prevent the relatively lower temperature of the second coil section 60" from lowering the relatively higher temperature of the first coil section 60'), and yet allows the first condensing coil 60 to be positioned between the second zones 52*b*, 54*b* of the moisture transfer wheel 52 and heat exchange wheel 54.

In the first preferred embodiment, the second condenser coil 74 is also divided into first and second coil sections 74', 74", in the same manner that the first condensing coil 60 is divided into first and second coil sections 60', 60". For purposes of brevity, the second condensing coil 74 in FIG. 2 has been marked with element numerals which correspond to the element numerals of the description of the first condensing coil 60 without the accompanying description herein. It is believed that a reading of the description of the first condensing coil 60 in combination with viewing the element numerals in FIG. 2 of the second condensing coil 74 provide a sufficient understanding of the second condenser coil 74. However, the second condensing coil 74 is different from the first condensing coil 60 in one respect. That is, a hold-back valve 86 is disposed between the first and second coil sections 74', 74" in the sixth conduit 88 extending therebetween and the first coil section 74' is located upstream from the second coil section 74". The purpose of the hold-back valve 86 is described hereinafter. By locating the first coil section 74' closest to the moisture transfer wheel 52, it sees the coolest air from the moisture transfer wheel 52 to ensure that all of the fluid that flows through the first coil section 74' is condensed, as described in more detail below.

By locating the second condensing coil 74 downstream from the moisture transfer wheel 52, the relatively cool air exiting the moisture transfer wheel 52 is used to condense any refrigerant that has not been condensed by the first condensing coil 60. This is a unique and efficient manner to achieve pre-cooling of the process air 51 entering the moisture transfer wheel 52 when the wet bulb temperature of the ambient air is greater than 74 degrees F.

While it is preferred that the first and second condensing coils 60, 74 be separated into the first and second coil sections 60',74',60",74", it is understood by those of ordinary skill in the art from this disclosure that the pre-cooling of the process air 51 could be attained even if the first and second condensing coils 60, 74 where constructed of a single coil or section.

As shown in FIG. 2, the system 10 further includes a refrigeration fluid receiver 90 in fluid communication with the second side 60*b* of the first condenser coil 60 and the second side 50*b* of the first pre-cool evaporator coil 50. More particularly, a seventh conduit 92 extends between the outlet side 90*a* of the receiver 90 and the fourth conduit 78 which is in fluid communication with the first pre-cool evaporator coil 50. An eighth conduit 94 extends between the inlet side 90*b* of the receiver 90 and the third conduit 76, which is fluid communication with the second side 60*b* of the first condenser coil 60. The eighth conduit 94 includes a pressure regulator valve 96 which senses the pressure of the refrigerant fluid within the receiver 90. When the pressure of the refrigerant fluid within the receiver 90 falls below a predetermined value, the pressure regulator valve 96 opens to allow refrigerant fluid within the first condenser coil 60 to flow into the receiver 90, as described in more detail hereinafter. It is preferred that the receiver 90 be in fluid communication with the second side 60b of the first condensing coil 60, as oppose to the second conduit 70 which would result in diverting needed hot refrigerant fluid away from the first condensing coil 60.

The system 10 further includes a second compressor 98 in parallel with the first compressor 66. The second compressor 98 includes a suction side 98a in fluid communication with the first side 50a of the first pre-cool evaporator coil and a discharge side 98b in fluid communication with the first side 60a of the first condenser coil 66. More particularly, a ninth conduit 100 extends between the suction side 98a of the second compressor 98 and the first conduit 68 which is in fluid communication with the first side 50a of the first pre-cool evaporator coil 50. A tenth conduit 102 extends between the discharge side 98b of the second compressor 98 and the second conduit 70 which is in fluid communication with the first side 60a of the first condensing coil 60.

The first compressor 66 is sized to provide sufficient energy to pre-cool the process air 51 when the wet bulb temperature of the process air 51 is between 70 and 74 degrees Fahrenheit. The second compressor 98 is sized to provide sufficient energy, in combination with the first compressor 66, to pre-cool the process air 51 when the wet bulb temperature of the process air 51 is greater than 74 degrees Fahrenheit, as described in more detail hereinafter. Using two different sized compressors is more energy efficient than one large compressor when the wet bulb temperature is less than 74 degrees Fahrenheit and since a wet bulb temperature of greater than 74 degrees Fahrenheit does not occur regularly, the full use of a large compressor would also not occur often. While it is preferred that two compressors be used to achieve the appropriate amount of pre-cooling, it is understood by those of ordinary skill in the art from this disclosure that any number of compressors could be used, including one, three or four, without departing from the spirit and scope of the invention.

As mentioned above, the system 10 includes a hold-back valve 86. The hold-back valve 86 is positioned between the first side 74a of the second condenser 74 and the first pre-cool evaporator 50. The hold-back valve 86 is responsive to a pressure of the refrigerant fluid within at least a portion of the second condenser 74 such that the hold-back valve 86 is open when the pressure of the refrigerant fluid within the portion of the second condenser 74 is above a predetermined pressure and the hold-back valve 86 is closed when the pressure of the refrigerant fluid within the portion of the second condenser 74 is below the predetermined pressure. More particularly, and as mentioned above, the hold-back valve 86 is in fluid communication with and is positioned between the first and second coil sections 74', 74" of the second condensing coil 74. That is, the sixth conduit 88 includes the hold-back valve 86. The portion of the second condenser coil 74 which is being sensed by the hold-back valve 86 is the second coil section 74".

In the first preferred embodiment, the system 10 further includes a second pre-cool evaporator coil 104 positioned between the first pre-cool evaporator coil 50 and the first zone 52a of the moisture transfer wheel 52. The second pre-cool evaporator coil 104 includes a first side 104a which is in fluid communication with the suction side 98a of the second compressor 98 and the suction side 66a of the first compressor 66 via an eleventh conduit 106 which is in fluid communication with the first conduit 68. The second pre-cool evaporator coil 104 includes a second side 104b in fluid communication with the second side 74b of the second condenser coil 74 via a twelfth conduit 108 which is in fluid communication with the fourth conduit 78.

The receiver 90 is also in fluid communication with the second side 74b of the second condenser coil 74 so that the first pre-cool evaporator 50 can receive refrigerant fluid from the fluid receiver 90 when the hold-back valve 86 is closed, as described in more detail hereinafter.

The system 10 further includes a recovery evaporator coil 110 positioned between the second zone 52b of the moisture transfer wheel 52 and the ambient space such that the regenerative air 58 passes through the recovery evaporator coil 110. More particularly, the recovery evaporator coil 110 is positioned downstream of the second condenser coil 74 and includes a first side 110a in fluid communication with the suction sides 66a, 98a of the first and second compressors 66, 98, and a second side 110b in fluid communication with the second side 60b of the first condenser coil 60. More particularly, a thirteenth conduit 112 extends between the first side 110a of the recovery evaporator coil 110 and the first conduit 68. The thirteenth conduit 112 includes a crank case pressure regulator 114 for sensing the pressure of refrigerant fluid within the first conduit 68, for reasons described hereinafter. A fourteenth conduit 116 extends from the second side 110b of the recovery evaporator coil 110 and is in fluid communication with the fourth conduit 78 which is in fluid communication with the second side 74b of the second condensing coil 74 and the outlet 90a of the receiver 90 via the seventh conduit 92. As such, the recovery evaporator coil 110 and the first pre-cool evaporator coil 50 are arranged in parallel between the first condenser coil 60 and the first compressor 66.

The second side 50b, 104b, 110b, of each of the first pre-cool evaporator coil 50, second pre-cool evaporator coil 104 and recovery evaporator coil 110 are in fluid communication with an expansion valve which affects a pressure drop of the refrigerant fluid flowing into the respective coil and a solenoid valve, commonly designated 50c, 104c, and 110c, respectively. The solenoid valves are used to control the flow of refrigerant fluid into the respective coils in accordance with the operation of the system 10, as described hereinafter. The solenoid valves are standard, electrically operated, off-the-shelf items well understood by those skilled in the art, accordingly, further description thereof is omitted for purposes of convenience only, and is not limiting.

In the first preferred embodiment, the system 10 senses the wet-bulb temperature of the process air 51 entering the system 10 through the use of an enthalpy sensor 118 located just upstream from the first pre-cool evaporator coil 50. Enthalpy sensors are well known to those of ordinary skill in the art, accordingly, further description thereof is omitted for purposes of convenience only, and is not limiting. The position of the solenoid valves 50c, 104c, 110c and the selection of which of the first and second compressors 66, 98 is operating are controlled by a microprocessor (not shown) in response to the wet bulb temperature of the process air 51 sensed by the enthalpy sensor 118, as described below. It is also understood by those skilled in the art from this disclosure that other methods could be used to sense the wet-bulb temperature of the process air 51 just prior to entering the first pre-cool evaporator coil 50. For instance, the second compressor 98 could be controlled in response to the load on the first compressor 66. That is, if the pressure within the first compressor 66 is above a predetermined value, the second compressor 98 could automatically begin operation.

Figure 7:
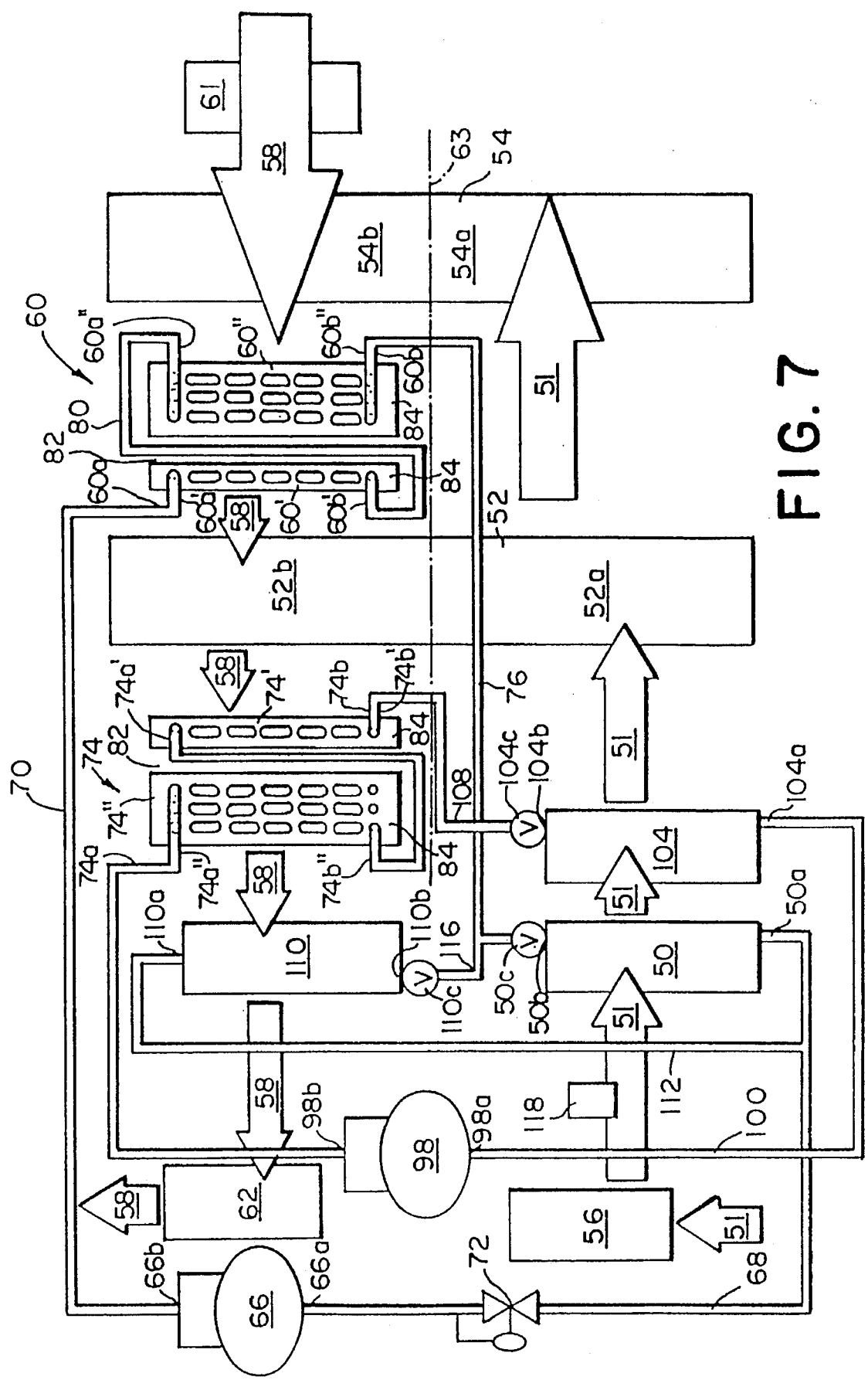
FIG. 7 is a schematic view of a hybrid air-conditioning system in accordance with a second preferred embodiment of the invention.

Referring now to FIG. 7, there is shown a second preferred embodiment of a hybrid air-conditioning system 10 in accordance with the present invention. The system 10 in accordance with the second preferred embodiment is very similar to the first preferred embodiment, except for the following differences. The second compressor 98, second condenser coil 74 and second pre-cool evaporator coil 104 are fluidly coupled in an independent standard heat pump configuration. Similarly, the first compressor 66, first condenser coil 60, first pre-cool evaporator coil 50 and recovery evaporator coil 110 are fluidly coupled together as an independent circuit. The following is a brief description of the system 10 in accordance with the second preferred embodiment.

Referring now to FIG. 7, the discharge side 66b of the first compressor 66 is in fluid communication with the first condenser coil 60 via the second conduit 70. The first condensing coil 60 of the second preferred embodiment is identical to the first condensing coil 60 of the first preferred embodiment. The second side 50b of the first pre-cool evaporator coil 50 is in fluid communication with the second side 60b of the first condensing coil 60 via the third conduit 76. The second side 110b of the recovery evaporator coil 110 is also in fluid communication with the second side 60b of the first condensing coil 60 via the fourteenth conduit 116 and the third conduit 76. The first side 50a of the first pre-cool evaporator coil 50 is in fluid communication with the suction side 66a of the first compressor 66 via the first conduit 68 which includes a crank case pressure regulator 72. The first side 110a of the recovery evaporator coil 110 is in fluid communication with the suction side 66a of the first compressor 66 via the thirteenth conduit 112 which is in fluid communication with the first conduit 68.

The discharge side 98b of the second compressor 98 is in fluid communication with the first side 74a of the second condensing coil 74. The second condensing coil 74 of the second preferred embodiment is identical to the second condensing coil 74 of the first preferred embodiment, except that the hold-back valve 86 is omitted. The second side 104b of the second pre-cool evaporator coil 104 is in fluid communication with the second side 74b of the second condensing coil 74 via the twelfth conduit 108. The first side 104a of the second pre-cool evaporator coil 104 is in fluid communication with the suction side 98a of the second compressor 98 via the ninth conduit 100.

Figure 8:
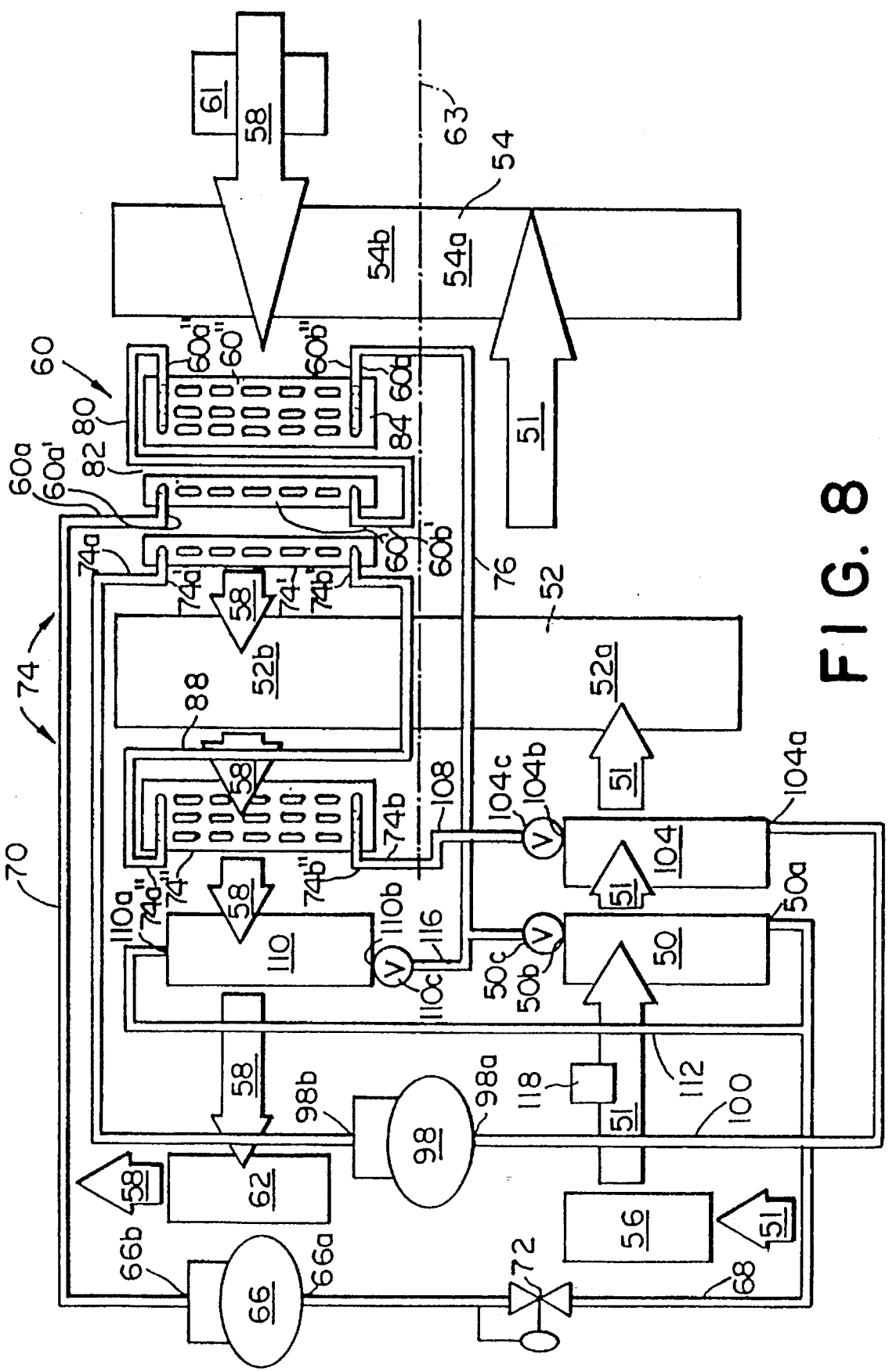
FIG. 8 is a schematic view of a hybrid air-conditioning system in accordance with a third preferred embodiment of the invention.

Referring now to FIG. 8, there is shown a third preferred embodiment of a hybrid air-conditioning system 10 in accordance with the present invention. The system 10 in accordance with the third preferred embodiment is very similar to the second preferred embodiment, except for the following differences. The second condensing coil 74 is divided into first and second coil sections 74' and 74". The first coil section 74' has a first side 74a' in fluid communication with the discharge side 98b of the second compressor 98. The first coil section 74' of the second condenser coil 74 includes a second side 74b' in fluid communication with a first side 74a" of the second coil section 74" via a sixth conduit 88. The second coil section 74" has a second side 74b" in fluid communication with the second side 104b of the second pre-cool evaporator coil 104 through the twelfth conduit 108. The first coil section 74' of the first condenser coil 74 is located between the first coil section 60' of the first condenser coil 60 and the second zone 52b of the moisture transfer wheel 52. The following is a brief description of the system 10 in accordance with the third preferred embodiment.

With respect to FIG. 8, the discharge side 66b of the first compressor 66 is in fluid communication with the first condenser coil 60 via the second conduit 70. The first condensing coil 60 of the third preferred embodiment is identical to the first condensing coil 60 of the first preferred embodiment. The second side 50b of the first pre-cool evaporator coil 50 is in fluid communication with the second side 60b of the first condensing coil 60 via the third conduit 76. The second side 110b of the recovery evaporator coil 110 is also in fluid communication with the second side 60b of the first condensing coil 60 via the fourteenth conduit 116 and the third conduit 76. The first side 50a of the first pre-cool evaporator coil 50 is in fluid communication with the suction side 66a of the first compressor 66 via the first conduit 68 which includes a crank case pressure regulator 72. The first side 110a of the recovery evaporator coil 110 is in fluid communication with the suction side 66a of the first compressor 66 via the thirteenth conduit 112 which is in fluid communication with the first conduit 68.

The discharge side 98b of the second compressor 98 is in fluid communication with the first side 74a of the second condensing coil 74. The second condensing coil 74 of the third preferred embodiment is separated into first and second coil sections 74' and 74", similar to the first and second embodiments; however, the first coil section 74' of the second condenser coil 74 is positioned between the first condenser coil 60' and the second zone 52b of the moisture transfer wheel 52. The first coil section 74' of the second condenser coil 74 is separated by an air gap from the first coil section 60' of the first condenser coil 60 to minimize heat transfer between coils 60 and 74. The second coil section 74" of the second condenser coil 74 is positioned between the second zone 52b of the moisture transfer wheel 52 and the ambient space such that the regenerative air 58 passes through the first and second coil sections 74' and 74" of the second condenser coil 74. The second side 104b of the second pre-cool evaporator coil 104 is in fluid communication with the second side 74b of the second condensing coil 74 via the twelfth conduit 108. The first side 104a of the second pre-cool evaporator coil 104 is in fluid communication with the suction side 98a of the second compressor 98 via the ninth conduit 100.

With respect to FIG. 2, the system 10 is operated to control the condition of air in the enclosed space when the wet bulb temperature of the process air 51 in the ambient space (i.e., the process air 51 which enters the system 10) is greater than seventy-four degrees Fahrenheit, by rotating the moisture transfer and heat exchange wheels 52, 54 in a manner well-understood by those skilled in the art, and as described in U.S. Pat. No. 5,148,374, which is incorporated herein by reference. While the moisture transfer and heat exchange wheels 52, 54 are rotating, the first and second compressors 66, 98 are operated to pass refrigerant fluid from the first and second compressors 66, 98 through the first condenser coil 60, second condenser coil 74, first pre-cool evaporator 50, second pre-cool evaporator 104 and back to the first and second compressors 66, 98 such that the process air 51 between the second pre-cool evaporator 104 and the first zone 52a of the moisture transfer wheel 52 has a dry-bulb temperature of less than or equal to about seventy degrees Fahrenheit.

More particularly, as the refrigerant fluid passes from the first and second compressors 66, 98, it is partially condensed in the first condenser coil 60, with a majority of the condensing occurring in the first coil section 60'. The refrigerant fluid then flows from the first condenser coil 60 to the second coil section 74" of the second condensing coil 74. As the refrigerant fluid exits the second coil section 74" of the second condensing coil 74, it is fully condensed. As such, the hold-back valve 86, which is sensing the pressure of the refrigerant fluid as it exits the second coil section 74" of the second condensing coil 74, remains open and the refrigerant fluid passes to the first coil section 74' of the second condensing coil 74. Any flashing of refrigerant fluid that occurs as the refrigerant fluid flows through the hold-back valve 86, is condensed in the first coil section 74' of the second condensing coil 74. With the solenoid valves 50c, 104c of the first and second pre-cool evaporator coils 50, 104 in the open position, and the solenoid valve 110c of the recovery evaporator 110 in the closed position, the refrigerant fluid flows from the second side 74b of the second condensing coil 74 to the first and second pre-cool evaporator coils 50, 104 through the fourth conduit 78 and twelfth conduit 108. The refrigerant fluid then flows from the first and second pre-cool evaporator coils 50, 104 in a relatively low temperature and pressure vapor form to the suction sides 66a, 98a of the first and second compressors 66, 98. The first crank case pressure regulator 72 remains open so long as the pressure of the refrigerant fluid on the suction sides 66a, 98a of the first and second compressors 66, 98 remains below a predetermined value for the purpose of not overloading the compressors. If the pressure of the refrigerant fluid on the suction sides 66a, 98a of the first and second compressors 66, 98 exceeds the predetermined value, the regulator 72 will partially close to throttle the flow of refrigerant to the first and second compressors 66, 98. The regulator 114 operates in a similar manner as anyone skilled in the art understands.

In operating the system 10, it is desired to control the fans 56, 62 to achieve a high normal air-flow velocity through the system 10. Preferably, the nominal air-flow velocity is about two hundred to about eight hundred feet per minute (FPM), and, more preferably, about four hundred to about five hundred FPM. After the process air 51 having a wet-bulb temperature of 74 degrees F. or greater flows across and then exits from the first and second pre-cool evaporator coils 50, 104 it has a dry-bulb temperature of about 71 degrees F. After the process air 51 emerges from the first zone 52a of the moisture transfer wheel 52, it has a dry-bulb temperature of about 105 to 120 degrees F. As the process air 51 emerges from the first zone 54a of the heat exchange wheel 54, it has a dry-bulb temperature of about 70 to 85 degrees F. Similarly, the regenerative air 58 enters the second zone 54b of the heat exchange wheel 54 at a dry-bulb temperature in the range of about 65 to 80 degrees F. after the regenerative air leaves the evaporator pad 61. The regenerative air 58 exits the second zone 54b of the heat exchange wheel 54 at a dry-bulb temperature of about 100 to 115 degrees F. As the regenerative air 58 flows across the first condensing coil 60, the dry-bulb temperature of the regenerative air 58 is raised to about 130 to 145 degrees F. and preferably 140 degrees F. The regenerative air 58 then passes through the second zone 52b of the moisture transfer wheel 52 and exits therefrom at a dry-bulb temperature of about 90 to 100 degrees F. The regenerative air 58 then flows across the second condensing coil 74, which raises its dry-bulb temperature to about 120 to 130 degrees F.

Operation of the second preferred embodiment of the system 10, shown in FIG. 7, when the wet-bulb temperature of the process air 51 entering the system 10 is greater than seventy-four degrees Fahrenheit is generally identical to that described above in connection with the first preferred embodiment. That is, the solenoid valves 50c, 104c for the first and second pre-cool evaporator coils 50, 104 are open while the solenoid valve 110c of the recovery evaporator coil 110 is closed. In this manner, the second compressor 98, second condensing coil 74 and second pre-cool evaporator coil 104 operate in the manner of a standard heat pump. The first compressor 66, first condensing coil 60, first pre-cool evaporator coil 50 operate in the same manner as that described above, except that the refrigerant fluid does not flow through the second pre-cool evaporator coil 104 or the second condensing coil 74.

Placement of the first pre-cool evaporator 50 ahead of the second pre-cool evaporator 104 minimizes the compressor compression ratios (absolute discharge pressure/absolute suction pressure) and increases efficiency. Because the process air 51 is warmer before it enters the first pre-cool evaporator coil 50, the temperature of the refrigerant fluid entering the suction side 66a of the first compressor 66 can be higher than the temperature of the refrigerant entering the suction side 98a of the second compressor 98. For example, in operation the temperature and pressure of the refrigerant at the suction sides 66a and 98a of the first and second compressors 66, 98 are 65 degrees F., 124 PSIA and 55 degrees F., 110 PSIA, respectively. The first condensing coil 60, which is located before the second zone 52b of the moisture transfer wheel 52 needs to operate at a higher condensing temperature (140 degrees F., 350 PSIA) than the second condensing coil 74 (120 degrees F., 275 PSIA), which is located after the second zone 52b of the moisture transfer wheel 52. Therefore, the compression ratio is minimized and the system efficiency is increased by having the first pre-cool evaporator 50 with the highest temperature refrigerant fluid as part of the same closed system as the first condensing coil 60 with the highest condensing temperature. This yields a compression ratio for the first compressor 66 of 2.8 (350 PSIA/124 PSIA) and a compression ratio for the second compressor of 2.5 (275 PSIA/110 PSIA) (versus 3.2 (350 PSIA/110 PSIA) for the first compressor 66 if the positions of the first and second pre-cool recovery evaporators 50 and 104 were reversed).

Operation of the third preferred embodiment of the system 10, shown in FIG. 8, when the wet-bulb temperature of the process air 51 entering the system 10 is greater than seventy-four degrees Fahrenheit is generally identical to that described above in connection with the second preferred embodiment. However, as the regenerative air 58 flows across the first condensing coil 60, the dry-bulb temperature of the regenerative air 58 is raised to about 130 to 145 degrees F. and preferably 140 degrees F. The regenerative air then passes through the first coil section 74' of the second condenser coil 74 to further increase the regenerative air 58 temperature or to maintain the same leaving air temperature and operate at a lower condensing temperature, improving the compressor's efficiency. The regenerative air 58 then passes through the second zone 52b of the moisture transfer wheel 52 and exits therefrom at a dry-bulb temperature of about 90 to 100 degrees F. The regenerative air 58 then flows across the second coil section 74" of the second condensing coil 74, which raises its dry-bulb temperature to about 120 to 130 degrees F. Placement of the first pre-cool evaporator 50 ahead of the second pre-cool evaporator 104 still minimizes the compressor compression ratios (absolute discharge pressure/absolute suction pressure) and increases efficiency in a similar manner to that described above in connection with the second embodiment even though the first coil section 74' of the second condenser coil 74 is located on the upstream side of the moisture transfer wheel 52. The larger relative size of the second coil section 74" in comparison to the first coil section 74' of the second condenser coil 74 allows the second condenser coil 74 to operate at a lower condensing temperature in comparison to the first condenser coil 60.

With respect to the first preferred embodiment, when the wet-bulb temperature of the process air 51 in the ambient space is between seventy and seventy-four degrees Fahrenheit, the system 10 is operated in a manner generally similar to that described above, except that the second condenser 74, second pre-cool evaporator coil 104 and second compressor 98 are not operating. That is, the solenoid valves 104c, 110c of the second pre-cool evaporator coil 104 and recovery evaporator coil 110 are closed and the solenoid valve 50c of the first pre-cool evaporator coil 50 is open. As refrigerant fluid flows through the first condensing coil 60, it is almost entirely condensed. As such, the hold-back valve 86 will sense the drop in pressure of the refrigerant fluid in the second coil section 74" of the second condensing coil 74, and close. Once the hold-back valve 86 is closed, refrigerant fluid within the second coil section 74" of the second condensing coil 74 begins to back up toward the first condensing coil 60. Similarly, since the first pre-cool evaporator coil 50 can no longer draw refrigerant fluid from the second condensing coil 74, it begins to draw condensed refrigerant fluid from the receiver 90. This will result in the pressure of the refrigerant fluid within the receiver 90 falling below a predetermined value thereby causing the pressure regulator valve 96 to open. With the pressure regulator valve 96 open, the condensed fluid from the first condensing coil 60 flows directly to the receiver 90.

It is only necessary to use the first condensing coil 60, first compressor 66 and first pre-cool evaporator coil 50 because when the process air 51 has a wet-bulb temperature of between seventy-four and seventy degrees Fahrenheit, the first condensing coil 60 and first pre-cool evaporator coil 50 are all that is necessary to bring the wet-bulb temperature of the process air 51 entering the system 10 to a dry-bulb temperature of seventy degrees Fahrenheit. Therefore, the system 10 can operate in a more energy-efficient manner when the temperature of the process air 51 is in this range.

With respect to the second preferred embodiment of FIG. 7, the second compressor 98, second condensing coil 74 and second pre-cool evaporator coil 104 are simply not operating when the wet-bulb temperature of the process air 51 entering the system is between seventy-four and seventy degrees Fahrenheit. Similarly, the solenoid valve 110c of the recovery evaporator coil 110 is closed while the solenoid valve 50c of the first pre-cool evaporator coil 50 is open. In this manner, the refrigerant fluid flows through the first compressor 66, first condensing coil 60 and first pre-cool evaporator coil 50, generally in a manner which is similar to that described above in connection with the first preferred embodiment.

With respect to the third preferred embodiment of FIG. 8, when the wet-bulb temperature of the process air 51 in the ambient space is between seventy and seventy-four degrees Fahrenheit, the system 10 is generally operated in a manner identical to that described above in connection with the second preferred embodiment.

Referring now to FIG. 2, when it is necessary to control the humidity of air in the enclosed space when the wet-bulb temperature of the process air 51 in the ambient space is less than seventy degrees Fahrenheit, the first compressor 66 passes refrigerant fluid through the first condensing coil 60, the first pre-cool evaporator 50 and the recovery evaporator coil 110 and back to the first compressor 66. Thus, the solenoid valves 50c, 110c of the first pre-cool evaporator coil 50 and recovery evaporator coil 110, respectively, are open while the solenoid valve 104c of the second pre-cool evaporator coil 104 is closed. In this mode, the hold-back valve 86 is closed, but the first pre-cool evaporator coil 50 cannot completely evaporate the refrigerant flowing therethrough because of the reduced load provided by the lower temperature process air 51 entering the system 10. As such, the recovery coil 110 assists in completely evaporating the refrigerant fluid flowing from the first condensing coil 60 to the first compressor 66. Therefore, the first pre-cool evaporator coil 50 only does a small amount of cooling of the process air 51 flowing therethrough, and the majority of the evaporation occurs in the recovery evaporator coil 110. While little or no pre-cooling of the process air 51 flowing into the system 10 is necessary to dehumidify the enclosed space when the wet-bulb temperature of the processor 51 is below seventy degrees Fahrenheit, the first condensing coil 60 is still used to raise the temperature of the regenerative air 58 entering the second zone 52b of the moisture transfer wheel 52 to one-hundred-and-forty degrees Fahrenheit or above. Thus, the recovery evaporator coil 110 is needed to balance the condensing done in the first condensing coil 60.

The second preferred embodiment of the system 10, shown in FIG. 7, is operated in a similar manner to control the humidity in the air in the enclosed space when the wet-bulb temperature of the process air 51 is less than seventy degrees Fahrenheit. The first compressor 66 passes refrigerant fluid through the first condensing coil 60, the first pre-cool evaporator 50 and the recovery evaporator coil 110 and back to the first compressor 66. Thus, the solenoid valves 50c, 110c of the first pre-cool evaporator coil 50 and recovery evaporator coil 110, respectively, are open. The second compressor 98, second condenser coil 74 and second pre-cool evaporator coil 104 are not operating.

While it is preferred that the dry bulb temperature of the process air 51 entering the first zone 52a of the moisture transfer wheel 52 be less than or equal to 70 degrees Fahrenheit, it is understood by those skilled in the art from this disclosure that the present invention is not limited to pre-cooling the process air 51 to any particular temperature since the preferred temperature of the process air 51 entering the first zone 52a of the moisture transfer wheel 52 is dictated by the performance of the moisture transfer wheel 52. That is, for any moisture transfer wheel it is the temperature relationship between the process air leaving the moisture transfer wheel and the required regeneration temperature of the regeneration air entering the moisture transfer wheel, described above, which controls the preferred temperature of the process air entering the moisture transfer wheel.

The third preferred embodiment of the system 10, shown in FIG. 8, is operated in the same manner as the second embodiment to control the humidity in the air in the enclosed space when the wet-bulb temperature of the process air 51 is less than seventy degrees Fahrenheit.

From the foregoing description, it can be seen that the present invention comprises a hybrid air-conditioning system. It will be appreciated by those skilled in the art from this disclosure that changes could be made to the embodiments described above in the foregoing description without departing from the broad, inventive concepts thereof. Thus, the present invention is not limited to any particular manner of pre-cooling the process air 51 which enters the first zone 52a of the moisture transfer wheel 52. For instance, the pre-cool evaporator coils could be tied to a refrigeration system which is not related to any other portion of the system 10 or another type of cooling mechanism, such as water from a cooling tower, could be used to pre-cool the process air 51. It is understood, therefore, that this invention is not limited to the particular embodiments disclosed, but is intended to cover all modifications which are within the scope and spirit of the invention as defined by the appended claims.

I claim:

1. A hybrid air-conditioning system for controlling the condition of air in a building enclosed space comprising:

first means for passing process air from an ambient space through a first pre-cool evaporator coil, through a first zone of a rotatable moisture transfer wheel and then through a first zone of a rotatable heat exchange wheel to an enclosed and conditioned space;

second means for passing regenerative air from the enclosed and conditioned space through a second zone of said heat exchange wheel, through a first condenser coil, through a second zone of said moisture transfer wheel and then to the ambient space;

a first compressor having a suction side in fluid communication with a first side of said first pre-cool evaporator coil and a discharge side in fluid communication with a first side of said first condenser coil, a second side of said first pre-cool evaporator coil being in fluid communication with a second side of said first condenser coil; and a second compressor having a suction side in fluid communication with a first side of a second pre-cool evaporator coil and a discharge side in fluid communication with a first side of a second condenser coil, said second condenser coil having a second side in fluid communication with a second side of said second pre-cool evaporator coil, the second condenser coil having first and second coil sections, said first coil section of said second condenser coil being positioned between said first condenser coil and said second zone of said moisture transfer wheel and said second coil section of said second condenser coil being positioned between said second zone of said moisture transfer wheel and said ambient space such that the regenerative air passes through said first and second sections of said second condenser coil.

2. The hybrid air-conditioning system as recited in claim 1 wherein said second pre-cool evaporator coil is positioned between said first pre-cool evaporator coil and said first zone of said moisture transfer wheel.

3. The hybrid air-conditioning system as recited in claim 1 wherein said first coil section of said second condenser coil has a first side in fluid communication with said discharge side of said second compressor and a second side in fluid communication with a first side of said second coil section of said second condenser coil, said second coil section of said second condenser coil having a second side in fluid communication with said second side of said second pre-cool evaporator coil.

4. The hybrid air-conditioning system as recited in claim 1 wherein said first and second coil sections of said second condenser coil each have a surface transfer area, said surface transfer area of said first coil section of said second condenser coil being less than the surface transfer area of said second coil section of said first condenser coil.

5. The hybrid air-conditioning system as recited in claim 1 wherein said first condenser coil is divided into first and second coil sections, said first coil section of said first condenser coil having a first side in fluid communication with said discharge side of said first compressor and a second side in fluid communication with a first side of said second coil section of said first condenser coil, said second coil section of said first condenser coil having a second side in fluid communication with said second side of said first pre-cool evaporator coil, said first coil section of said first condenser coil being spaced from said second coil section by an air gap to minimize heat transfer between the first and second coil sections of said first condenser coil.

6. The hybrid air-conditioning system as recited in claim 5 wherein said first and second coil sections of said first condenser coil each have a surface transfer area, said surface transfer area of said first coil section of said first condenser coil being less than the surface transfer area of said second coil section of said first condenser coil.

7. The hybrid air-conditioning system as recited in claim 1 further comprising a recovery evaporator coil positioned between said second zone of said moisture transfer wheel and said ambient space such that the regenerative air passes through said recovery evaporator coil, said recovery evaporator coil having a first side in fluid communication with said suction side of said first compressor and a second side in fluid communication with said second side of said first condenser, said first pre-cool and recovery evaporator coils being arranged in parallel between said first condenser coil and said first compressor.

8. A method of operating the hybrid air-conditioning system of claim 1 for controlling the condition of air in the enclosed space when the wet bulb temperature of the process air in the ambient space is greater than 74 degrees F. comprising the steps of: rotating the moisture and heat transfer wheels while operating the first and second compressors to respectively pass refrigerant fluid from the first and second compressors through the first and second condenser coils, first and second pre-cool evaporator coils and back to the first and second compressors such that process air entering the first zone of the moisture transfer wheel has a dry bulb temperature of less than or about equal to 70 degrees F.

* * * * *